US009628784B2

United States Patent
de la Barré et al.

(10) Patent No.: US 9,628,784 B2
(45) Date of Patent: Apr. 18, 2017

(54) AUTOSTEREOSCOPIC DISPLAY AND METHOD OF DISPLAYING A 3D IMAGE

(71) Applicant: Fraunhofer-Gesellschaft zur Foerderung der Angewandten Forschung e.V., Munich (DE)

(72) Inventors: René de la Barré, Mittweida (DE); Silvio Jurk, Berlin (DE)

(73) Assignee: FRAUNHOFER-GESELLSCHAFT ZUR FOERDERUNG DER ANGEWANDT FORSCHUNG E.V., Munich (DE)

( * ) Notice: Subject to any disclaimer, the term of this patent is extended or adjusted under 35 U.S.C. 154(b) by 137 days.

(21) Appl. No.: 14/374,523

(22) PCT Filed: Jan. 25, 2013

(86) PCT No.: PCT/EP2013/051487
§ 371 (c)(1),
(2) Date: Jul. 24, 2014

(87) PCT Pub. No.: WO2013/110779
PCT Pub. Date: Aug. 1, 2013

(65) Prior Publication Data
US 2015/0015686 A1    Jan. 15, 2015

(30) Foreign Application Priority Data

Jan. 26, 2012 (DE) .................. 10 2012 001 902
Apr. 25, 2012 (WO) .................. PCT/EP2012/001886
Oct. 15, 2012 (DE) .................. 10 2012 020 833

(51) Int. Cl.
*H04N 13/04*    (2006.01)

(52) U.S. Cl.
CPC ..... *H04N 13/0447* (2013.01); *H04N 13/0404* (2013.01); *H04N 13/0468* (2013.01); *H04N 13/0497* (2013.01); *H04N 13/0415* (2013.01)

(58) Field of Classification Search
USPC .......................................................... 348/59
See application file for complete search history.

(56) References Cited

U.S. PATENT DOCUMENTS

| 5,822,117 A | 10/1998 | Kleinberger |
| 6,195,069 B1 | 2/2001 | Rhoads |

(Continued)

FOREIGN PATENT DOCUMENTS

| CN | 104221372 A | 12/2014 |
| DE | 10043305 A1 | 3/2002 |

(Continued)

OTHER PUBLICATIONS

International Preliminary Report on Patentability issued in PCT/EP2012/001886, completed Jul. 29, 2014, 7 pages.

(Continued)

*Primary Examiner* — Jamie Atala
*Assistant Examiner* — Hesham Abouzahra
(74) *Attorney, Agent, or Firm* — Faegre Baker Daniels LLP

(57) ABSTRACT

An autostereoscopic display for simultaneously displaying more than two different images. The display including: a pixel matrix having pixels distributed over different subsets; an optical element, which has a grid-like structure and imposes a propagation direction on light from the pixels so that a plurality of viewing zones are defined so that each of the viewing zones is associated with exactly one of the subsets and the light from each of the subsets is directed into the viewing zone associated with this subset; and a control unit for controlling the pixel matrix based on image data (Continued)

defining a 3D image. The control unit configured to: determine a value of a location coordinate; determine intensity values defined by the image data for an image strip corresponding to a direction of gaze from a position defined by the value; and control the pixels of this strip using the intensity values.

20 Claims, 4 Drawing Sheets

(56) References Cited

U.S. PATENT DOCUMENTS

| | | |
|---|---|---|
| 6,307,585 B1 | 10/2001 | Hentschke |
| 6,366,281 B1 | 4/2002 | Lipton et al. |
| 6,603,504 B1 | 8/2003 | Son et al. |
| 6,791,570 B1 | 9/2004 | Schwerdtner et al. |
| 7,697,750 B2 | 4/2010 | Simmons |
| 2006/0132916 A1 | 6/2006 | Oikawa et al. |
| 2006/0170764 A1 | 8/2006 | Hentschke |
| 2006/0215018 A1 | 9/2006 | Fukushima et al. |
| 2006/0279567 A1 | 12/2006 | Schwerdtner et al. |
| 2008/0007559 A1 | 1/2008 | Kalaiah et al. |
| 2008/0024598 A1 | 1/2008 | Perlin et al. |
| 2008/0055547 A1 | 3/2008 | Saishu et al. |
| 2008/0117231 A1 | 5/2008 | Kimpe |
| 2008/0117233 A1 | 5/2008 | Mather et al. |
| 2009/0123030 A1 | 5/2009 | De La Barre et al. |
| 2009/0278936 A1 | 11/2009 | Pastoor et al. |
| 2010/0050316 A1 | 3/2010 | Leonard et al. |
| 2010/0295928 A1 | 11/2010 | De La Barre et al. |
| 2011/0128356 A1 | 6/2011 | de la Barr et al. |
| 2011/0216061 A1 | 9/2011 | De La Barre et al. |
| 2011/0216171 A1 | 9/2011 | De La Barre et al. |
| 2011/0310092 A1 | 12/2011 | de la Barr |
| 2013/0127861 A1* | 5/2013 | Gollier .................. H04N 13/04 345/426 |
| 2014/0002897 A1* | 1/2014 | Krijn .................. H04N 13/0404 359/463 |

FOREIGN PATENT DOCUMENTS

| | | | |
|---|---|---|---|
| DE | 102006031799 B3 | 1/2008 | |
| DE | 102010028668 B4 | 11/2010 | |
| EP | 0637815 A2 * | 2/1995 | ........... G06T 15/205 |
| EP | 0637815 B1 | 2/1995 | |
| EP | 0769881 A2 * | 4/1997 | ......... G02B 27/0093 |
| EP | 0769881 B1 | 4/1997 | |
| EP | 0877966 B1 | 11/1998 | |
| EP | 1689162 A2 | 8/2006 | |
| JP | 7296195 A | 11/1995 | |
| JP | 2015510328 A | 4/2015 | |
| KR | 20140126308 A | 10/2014 | |
| WO | WO9821620 A1 | 5/1998 | |
| WO | 2007043988 A1 | 4/2007 | |
| WO | WO 2007043988 A1 * | 4/2007 | ......... G02B 27/2214 |
| WO | WO2009095862 A1 | 8/2009 | |
| WO | WO2013110297 A1 | 8/2013 | |

OTHER PUBLICATIONS

International Preliminary Report on Patentability issued in PCT/EP2013/051487, completed Jul. 29, 2014, 8 pages.
International Search Report and Written Opinion issued in PCT/EP2012/001886, mailed Oct. 11, 2012, 10 pages.
International Search Report and Written Opinion issued in PCT/EP2013/051487, mailed Apr. 26, 2013, 11 pages.
International Search Report issued in PCT/EP2010/007441, mailed Mar. 16, 2011, 3 pages.
Konrad et al., 3-D Displays and Signal Processing an answer to 3-D ills?, IEEE Signal Processing Magazine 97 (Nov. 2007), p. 97-111.
Woodgate et al., "Autostereoscopic 3D display systems with observer tracking," Signal Processing: Image Communication 14 (1998), p. 131-145.

* cited by examiner

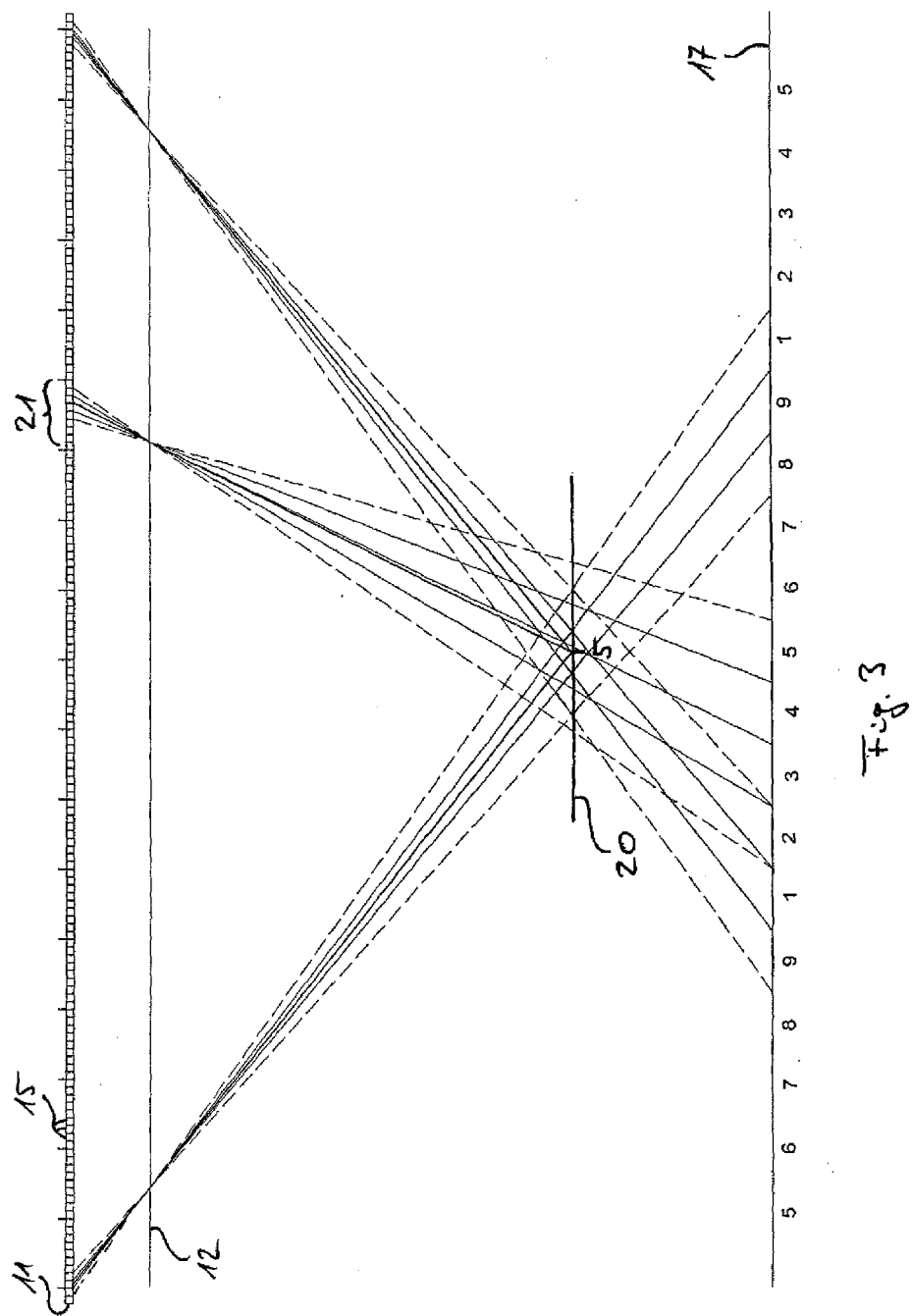

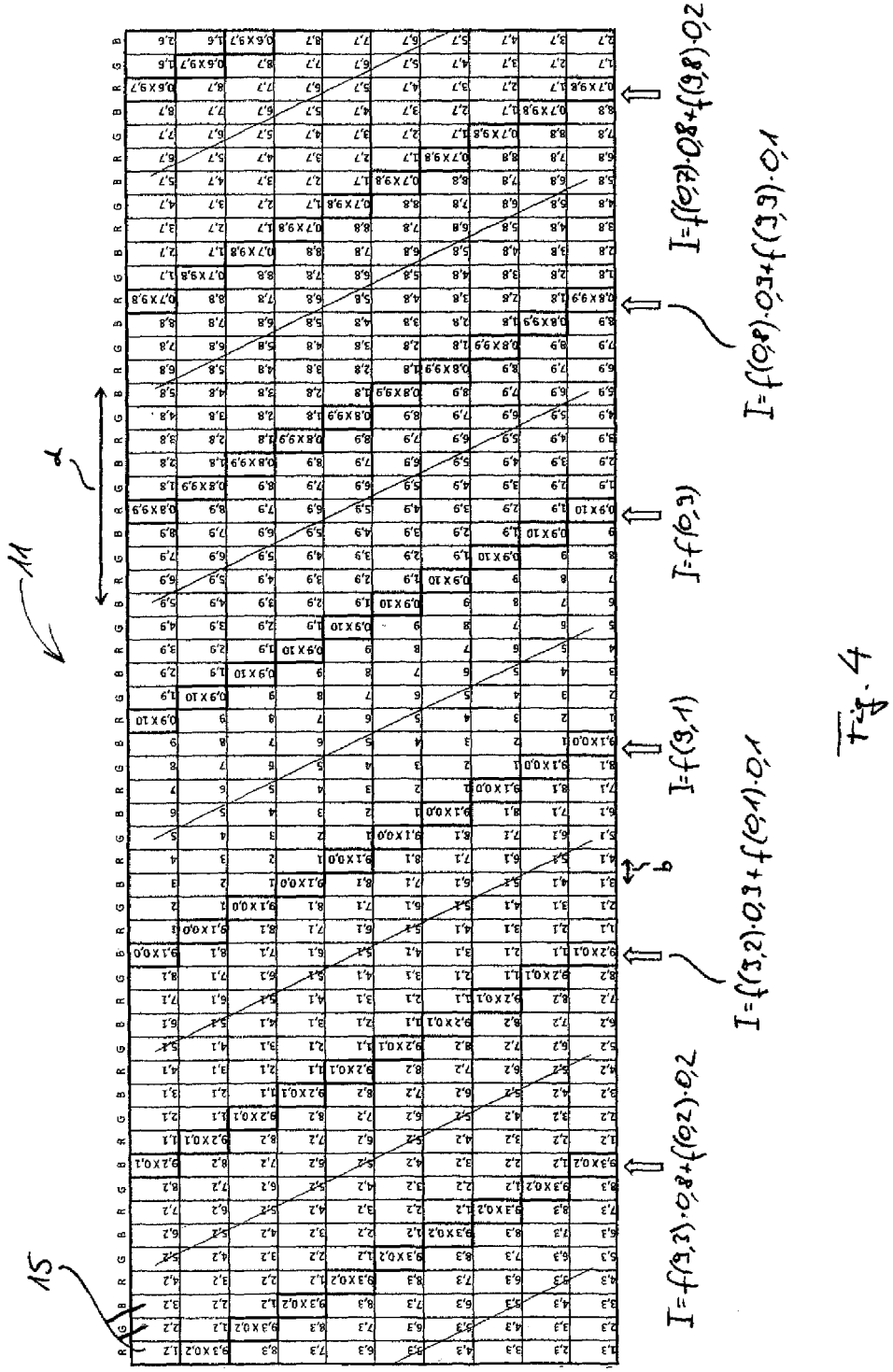

ered
AUTOSTEREOSCOPIC DISPLAY AND METHOD OF DISPLAYING A 3D IMAGE

CROSS-REFERENCE TO RELATED APPLICATIONS

This application is a national phase application of PCT Application No. PCT/EP2013/051487, internationally filed Jan. 25, 2013, which claims priority to the following applications: German Application No. 10 2012 001 902.5, filed Jan. 26, 2012; International Application No. PCT/EP2012/001886, filed Apr. 25, 2012; and German Application No. 10 2012 020 833.2, filed Oct. 15, 2012, all four of which are herein incorporated by reference in their entirety.

TECHNICAL FIELD

This disclosure relates to an autostereoscopic display for simultaneously displaying more than two different images and to a method of displaying a 3D image which can be carried out using such a display.

BACKGROUND

A generic display includes a pixel matrix having a multitude of pixels which are arranged in different rows, wherein a plurality of more than two disjoint subsets of pixels on the pixel matrix are defined such that each of the subsets forms a band of parallel strips which include a non-zero angle with the rows, wherein the strips belonging to the different subsets are interleaved such that strips and/or pixels of the different subsets alternate cyclically in the row direction. In addition, such a display comprises an optical element which is arranged in front of or behind the pixel matrix, which has a grid-like structure orientated parallel to the strips and imposes, for each of the pixels, a defined propagation direction on light emanating or transmitted from the respective pixel such that, at a nominal distance in front of the display predefined by a geometry of the display, a number, corresponding to the named plurality, of viewing zones, which are laterally offset relative to one another and of which each is associated with exactly one of the subsets are defined such that the light emanating or transmitted from each of the subsets of pixels is directed in the viewing zone associated with this subset.

SUMMARY

Displays of this kind are known as multiview displays. On a use of these displays, a respective one of a number, corresponding to the named plurality, of stereoscopic half-images is displayed on the named subgroups of pixels and a respective two of said half-images which are displayed on subgroups having directly adjacent strips combine pairwise to form a stereoscopic image. In this manner, not only a single viewer, but also several viewers positioned next to one another in front of the display can each autostereoscopically perceive an image of the same scene which appears three-dimensional. In addition, a viewer can move in a lateral direction in front of the display without losing the three-dimensional impression. He will rather see the same scene from a perspective changing according to his movement.

It is, however, disadvantageous in this respect that the viewer or each of the viewers can only see a 3D image of satisfactory quality if his eyes maintain the nominal distance from the display predefined by the geometry of the display. Otherwise each eye of the viewer namely sees shares in different regions of the display and in part overlaps of different half-images. Please note that the terms nominal distance, nominal spacing are used as synonyms in the present application and denote a particular viewing distance which is given by the geometry of the display and can be regarded as the nominal viewing distance.

It is an underlying object of this disclosure to describe an autostereoscopic display on which a respective image of three-dimensional effect of a displayed scene can be seen from distances which should be as freely selectable as possible, wherein it should be possible that several viewers simultaneously look at the display and there each see an image of three-dimensional effect of the scene and that a viewer moves laterally without him losing the three-dimensional impression. It is furthermore an object of this disclosure to describe a corresponding method of displaying 3D images on an autostereoscopic display which satisfies these demands.

In some embodiments, the display described in this disclosure has a control unit for controlling the pixel matrix in dependence on image data which define a 3D image. This is configured to carry out the respective following steps for each of the strips of pixels for controlling the pixel matrix for an autostereoscopic viewing of the 3D image from a viewing distance in front of the screen differing from the nominal distance:

determining a value of a location coordinate which describes a lateral position of locations on a line orientated in the row direction and disposed at a defined height in the viewing distance in front of the display, wherein the value is determined for the location at which light emanating or transmitted from the pixels of this strip—more precisely from centers of area of the respective pixels—is incident on the named line with the propagation direction imposed by the optical element;

determining intensity values which are defined by the image data for an image strip corresponding to this strip of a view of the 3D image which corresponds to a direction of gaze from a position defined by the named value;

controlling pixels of this strip using the so-called intensity values.

The determination of the respective value of the location coordinate in dependence on the viewing distance is possible in this respect by a simple arithmetic operation and only represents a use of projective geometry.

Various coordinate systems can be used as the basis for the definition of the location coordinate. In an expedient coordinate system having an x axis orientated in the row direction, a vertical y axis and a z axis orientated in the direction of a normal of the display plane, the named location coordinate can also be selected as the coordinate x. In this coordinate system, the viewing distance can be represented as z and a height by the coordinate y. Instead, however, any parameterization, preferably a constant parameterization, of the named line can be used as the location coordinate.

The named line can be a section of a horizontal straight line orientated parallel to the display. It is, however, also possible that the line is slanted or curved. In this case, let the named distance designate a distance between the display and a defined point, such as a central point, on the line. In addition, let the line be defined as limited in its length—that is only covering a space of such a limited width in front of the display—such that the value of the location coordinate determined in the described manner is unambiguous. That is, light rays should not be taken into consideration which are conducted through the optical element such that they are not led through one of the viewing zones that can be lying centrally in front of the display, but rather through so-called secondary zones.

Each value of the location coordinate corresponds to a viewing position on the named line which is here only called a position. The respective view is defined as the two-dimensional view of the 3D image or of the scene displayed by the 3D image which results from this viewing position or from the direction of gaze thereby predefined. An actual—or virtual—camera position can be associated with each value of the named location coordinate. The view which corresponds to a direction of gaze from the position defined by the respective value of the location coordinate means a view which results or would result by a taking of the named scene from the camera position associated with this value of the location coordinate.

The intensity values which are spoken of here can also be called brightness values or control values for the individual pixels. Therefore, they represent image information on the individual picture elements of the respective view to be displayed by the pixels. In the case of multicolor pixels, they can additionally contain color information or, in the case of a pixel matrix having pixels of different elementary colors, can depend on a color of the respective pixel—then usually called a subpixel. At least some of the views—or more precisely the image strips of the views belonging to the respective strips of pixels, and thus at least parts of the views—have to be calculated in dependence on the named image data to determine the required intensity values. These image data admittedly define the 3D image, but do not contain a priori all the image information of all possible views. They are rather only defined indirectly by the image data and are calculated as required—that is depending on the values of the location coordinate determined for the different strips. In addition, various processes can be considered of which some will be outlined further below.

It is achieved by the proposed measures that a viewer who looks at the correspondingly controlled display from the named viewing distance will also see an image of three-dimensional effect of good image quality when the viewing distance differs from the nominal distance. It is in particular achieved by the described control of the pixel matrix that the viewer sees two mutually complementary stereoscopic images which combine to a stereoscopic image at least in a very good approximation despite the viewing distance actually not matching the geometry of the display, with it simultaneously being avoided that conspicuous and disturbing irregularities or jumps occur on a lateral movement. The latter would not be able to be avoided if, instead of the proposed determination of the intensity values for the different strips of correspondingly defined views, ideally defined in each case, only the intensity values of a plurality of stereoscopic half-images defined in an unchanged manner were redistributed in response to the changed viewing distance between the pixels. The display can therefore be used for completely different viewing distances. An adaptation of the display itself to the viewing distance which under certain circumstances may be predefined by a specific use—e.g. by the positioning in a room of predefined size and division—is not necessary in this respect.

The term "stereoscopic half-images" in the present document should designate respective views of a scene of which two combine to one stereoscopic image of this scene in that they correspond to views from—actual or virtual—camera positions or eye positions which are laterally offset to one another by approximately an average distance between eyes. In the case of a band of more than two views having these properties, the individual views should therefore also be called stereoscopic half-images.

The aforementioned step of controlling the pixels using the determined intensity values can be done by controlling, for each strip, the pixels of the respective strip such that the image strip which corresponds to this strip of the view of the 3D image corresponding to the direction of gaze from the position defined by the named value of the location coordinate is reproduced by the pixels of this strip of pixels, wherein the image strip corresponding to this strip is a strip-shaped extract of said view having, in the complete view, an orientation and position corresponding to the orientation and position of the strip of pixels in the pixel matrix.

The display described can be a simple multiview display which is only equipped with a special control unit or an especially programmed control unit so that, in addition to the normal distance, other viewing distances are also possible at least within certain limits which are freely choosable. In some embodiments, the viewing zones are expediently dimensioned so that their lateral distance in each case approximately corresponds to an average distance between the eyes—e.g. 65 mm—the named plurality can e.g. be 9 or even more. The pixel matrix can be provided e.g. by an LCD or by an OLED display. The optical element can in particular be a parallax barrier or a lenticular screen. A combination of these screen types is also possible. In the case of a lenticular screen, the grid-like structure is typically formed by a group of parallel cylindrical lenses. Barrier screens, in particular slot screens, can be used as the parallax barrier. Finally, the optical element can also be a Fresnel structure or an LC structure which reproduces a slot screen or another screen type. The pixels can be multicolor pixels or subpixels of different elementary colors—e.g. red, green and blue. In the last named case, typically three respective pixels or subpixels from three mutually following rows will combine to form one color-neutral or true-color picture element.

The described configuration of the control unit of a corresponding display is particularly expedient if each of the strips from each of the rows of the pixel matrix contains at most one pixel, that is has a width of only one pixel. There is then namely no possibility of carrying out a lateral displacement of centers of brightness within the individual strips to adapt the control to the changed viewing distance.

Methods are described in this disclosure for displaying a 3D image on an autostereoscopic display of the described type which achieves the object set. In some embodiments, the method is a particular use of a display having a pixel matrix and an optical element arranged in front of or behind the pixel matrix, wherein the pixel matrix has a multitude of pixels which are arranged in different rows, wherein a plurality of more than two disjoint subsets of pixels on the pixel matrix are defined such that each of the subsets forms a band of parallel strips which include a non-zero angle with the rows, wherein the strips of the different subsets alternate cyclically in the row direction and wherein preferably each of the strips from each of the rows of the pixel matrix contains at most one pixel, and wherein the optical element has a grid-like structure orientated parallel to the strips and imposes, for each of the pixels, a defined propagation direction on light emanating or transmitted from the respective pixel such that, at a nominal spacing from the display predefined by a geometry of the display, a number, corresponding to the named plurality, of viewing zones which are laterally offset relative to one another are defined such that each of the viewing zones is associated with exactly one of the subsets and such that the light emanating or transmitted from each of the subsets of pixels is directed in the viewing zone associated with this subset.

In some embodiments, the pixel matrix is controlled in dependence on image data which define a 3D image for an autostereoscopic viewing of the 3D image from a viewing distance in front of the display which differs from the nominal distance. For this purpose, in some embodiments, the method includes the respective following steps for each of the strips of pixels:

determining a value of a location coordinate which describes a lateral position of locations on a line orientated in the row direction and disposed at a defined height in the viewing distance in front of the display, wherein the value is respectively determined for the location at which light emanating or transmitted from the pixels of this strip is incident on the named line with the propagation direction imposed by the optical element;

determining intensity values which are defined by the image data for an image strip corresponding to this strip of a view of the 3D image which corresponds to a direction of gaze from a position defined by the named value;

controlling pixels of this strip using the intensity values determined in this manner.

What was said on the display above applies accordingly to these method steps. So that an image quality which is as good as possible also results in the viewing distance different from the nominal distance, the location coordinate can be determined—in a scale which is as finely graduated as possible or even has no graduations—in each case so exactly that it adopts a number of different values for the different strips which is larger than then named plurality. The control unit of the proposed display can accordingly be configured to determine the location coordinate on a scale which is as finely graduated as possible or even has no graduations so exactly that it adopts a number of different values for the different strips which is larger than the named plurality.

The location coordinate namely adopts a number, corresponding to the named plurality, of possible values of the location coordinate for those locations whose lateral positions correspond to the previously named viewing zones or which are disposed, viewed from the display, exactly in front of or behind these viewing zones. In the present case, the location coordinate should therefore additionally also adopt or be able to adopt intermediate values between these discrete values. To keep the calculation effort within limits, it can, however, be advantageous if in each case only a limited number of discrete intermediate values is permitted and if the location coordinate is rounded up or down to the respective next closest permitted value or intermediate value. It can thus be achieved that the number of the views required in total, or more exactly of the views of which at least individual image strips are required or may be required, remains manageable.

The named views can be defined so that, for a number, corresponding to the named plurality, of values, they correspond to a number of stereoscopic half-images corresponding to this plurality of which in each case two, which correspond to values closest from one another from this number of values, combine to one stereoscopic image. They are the half-images which are displayed on the named subgroups on a conventional control of the display or when the viewing distance corresponds to the nominal distance. In the present case of a viewing distance differing from the nominal distance, at least one of the views, which corresponds to an intermediate value of the location coordinate, has to be selected corresponding to a direction of gaze disposed between the directions of gaze of these two stereoscopic half-images.

The location coordinate is determined in an expedient embodiment of the method such that, for a number, corresponding to the named plurality, of directly adjacent strips which extend centrally over the pixel matrix, it adopts the number of values named in the previous paragraph, whereas it adopts intermediate values for at least some of the strips disposed further outwardly. The control unit can accordingly be configured to determine the location coordinate in this manner. The control of the pixel matrix at the image center then does not differ or only differs insignificantly from the control provided for the nominal distance Any desired rendering processes can be used to determine the required intensity values for the different views. It is advantageously sufficient in each case in this respect if, for each of the views, the intensity views are only determined of the image strip or of those image strips for which the value of the location coordinate corresponding to this view has been determined. The required computation power therefore remains within limits which also makes the method usable for image sequences which are not defined in advance, but are defined in real time—for example in computer games or in the presentation of live shots which are filmed with stereoscopic cameras.

One possibility is that the intensity values are determined for the different views in that image information for the required image strip or strips of the respective view are determined from a depth map—or from several depth maps—defined by the named image data and from texture values defined by the image data for area segments of a surface represented by the depth map. Details on such a process for acquiring image information of a view not present in advance can be seen e.g. from document DE 10 2010 028 668 A1.

In some embodiments, the intensity values for the different views can be determined in that disparities between at least two stereoscopic half images, which are defined by the image data, are determined and image information is determined for the required image strip or strips in that the view is defined as an intermediate image between the named stereoscopic half-images in dependence on the disparities and on the respective value of the named location coordinate by interpolation and/or by transformation. Instructions on how this can be done can be found e.g. in the document U.S. Pat. No. 6,366,281 B1. Such processes are also called "morphing".

In some embodiments, the intensity values for the different views are determined in that disparities between at least two stereoscopic half-images, which are defined by the image data, are determined, from which disparities a depth map is calculated and, using this depth map, image information is determined for the required image strip or strips of the respective view.

Accordingly, the control unit of the display can be configured, for determining the intensity values for the different views, to determine image information for the required image strip or strips of the respective view from a depth map defined by the named image data and from texture values defined by the image data for surface segments of a surface represented by the depth map; or to determine disparities between at least two stereoscopic half-images which are defined by the image data and to determine image data for the image strip or strips of the respective view in that the view is defined as an intermediate image between the named stereoscopic half-images in dependence on the disparities and on the respective value of the named location coordinate by interpolation and/or by transformation; or to determine disparities between at least two stereoscopic half-images which are defined by the image data, to calculate a depth map from the disparities and to determine image information for the required image strip or strips of the respective view using this depth map.

So that the control can be automatically adapted to a current distance of a viewer from the display, the display can include a tracking device for determining a distance between the eyes of at least one viewer and the display and the control unit can be configured to control the pixel matrix for the viewing distance corresponding to this distance. The control unit is therefore then configured to control the pixel matrix—if the measured distance differs from the nominal distance—in the previously described manner so that the named viewing distance used as the basis for the control corresponds to the distance determined by the tracking device. In a correspondingly advantageously designed method, a distance from an eye pair of at least one viewer from the display is therefore detected, wherein the viewing distance is selected as corresponding to the spacing thus detected for determining the values of the location coordinate for the different strips. For this purpose, images of a space in front of the display taken by a stereoscopic camera can e.g. be evaluated using a suitable image evaluation process.

The subject of the present application can be described as a method for reproducing a 3D image on an autostereoscopic screen. In some embodiments, this screen has a pixel matrix with a large number of pixels as well as an optical element arranged in front of the pixel matrix and referred to hereinafter as an optical grid, wherein the pixels in the pixel matrix are arranged such that they form a large number of strips, arranged adjacently in an equidistant manner and referred to hereinafter as columns, with a column direction that is vertical or inclined relative to a vertical, and wherein the optical grid has a group of strip-shaped structures, which are oriented parallel to the columns and are arranged adjacently in an equidistant manner, and predefines, for each of the pixels, at least one defined plane of propagation of the light originating from the respective pixel, said plane of propagation being spanned from a defined horizontal direction of propagation and the column direction, wherein a period length of the optical grid defined by a lateral offset of adjacent strip-shaped structures is greater by a factor $n \times D_n/(D_n+a)$ than a lateral offset of the directly adjacent columns, wherein a denotes an effective distance between the pixel matrix and the optical grid, $D_n$ denotes the nominal viewing distance of the autostereoscopic screen, and n denotes an integer greater than two corresponding to number of the aforementioned plurality of more than two viewing zones.

In the use described here of a screen of this type, a method for reproducing a 3D image may comprise the following steps, which enable autostereoscopic viewing of the 3D image from a viewing distance L) deviating from the nominal viewing distance $D_n$:

assigning, to each of said columns, a value of a location coordinate in the viewer space and a further location coordinate value, wherein the value of the first-mentioned location coordinate gives a location on a coordinate axis oriented horizontally in front of the screen in the viewing distance D, i.e. a lateral position of a location, said location being defined by the fact that the light originating from the respective column and falling through the optical grid falls onto the coordinate axis at this location, and wherein the further location coordinate value gives a position, in a lateral direction, of the respective column or the strip-shaped structure of the optical grid, through which the light originating from the pixels of this column falls, calculating, for each of the columns, an extract of an image by image synthesis, wherein this image is given by a perspective of the 3D image to be reproduced from a position that is defined by the value of the first-mentioned location coordinate assigned to the respective column, and wherein the extract is defined by a strip of this image, which has a lateral position in this image that corresponds to the further location coordinate value assigned to the respective column, controlling the pixels in the pixel matrix in such a way that the extract thus calculated for each of the columns is recorded in the respective column.

It might be helpful for the understanding to see that the definition of the first-mentioned location coordinate given above implies that the value of the first-mentioned location coordinate corresponds to the location at which the plane of propagation, defined by the optical grid, of the light originating from the respective column intersects the aforementioned horizontal coordinate axis.

A region within which the 3D image is visible, is of relatively good quality and can be perceived three-dimensionally autostereoscopically is thus produced in the viewing distance D in front of the screen. Interference reducing the image quality however may occur at the edges of this region and can be visible in the form of strips running in the column direction—for example at an incline—and arranged adjacently in parallel. This interference is caused by crosstalk between adjacent columns or strips of pixels, in which extracts of images of relatively vastly different perspectives are reproduced. With the described control, extracts of images of which the perspectives or viewing directions generally only differ slightly are reproduced over the adjacent columns or strips of pixels. At each approximately $n^{th}$ column jump however, a much greater perspective jump arises in the opposite direction, which may lead to the aforementioned interference.

A measure is outlined hereafter that allows this interference to be attenuated at least. In this case, averaged intensity values are recorded in or reproduced by some of the columns. This preferably concerns the recording of a perspective or viewing direction deviating vastly from the directly adjacent columns in the extracts of images, that is to say the columns of the pixel matrix in which the aforementioned relatively large perspective jumps occur. In this case, contributions of the two perspectives corresponding to the right-hand and left-hand edge of the aforementioned region in front of the screen are averaged.

To be more precise, the pixels of selected strips of the strips of pixels are, in this case, controlled using averaged intensity values, the selected strips being determined as the strips or some of the strips for which the step of determining a value of the location coordinate results in that two solutions—i.e. two values of the location coordinate—are found within a given location coordinate interval due to the fact that the light emanating from the pixels of the respective strip propagates through two adjacent structures of the optical element, wherein each of the averaged intensity values is determined as an average of a first intensity value which is determined for the respective pixel for a first solution of the two solutions and a second intensity value which is determined for the same pixel for a second solution of the two solutions. The control unit can be configured accordingly. In some embodiments, the averaged intensity values are obtained by adding, for each of the pixels of a particular selected strip, the weighted first intensity value and the weighted second intensity value determined for the respective pixel, the first and the second intensity values being weighted depending on the determined value of the location coordinate, a weighting factor used for this averaging being smaller if the determined value is closer to a boundary of the given location coordinate interval and larger if the determined value is less close to a boundary of the given location coordinate interval.

BRIEF DESCRIPTION OF THE DRAWINGS

Embodiments described in the disclosure will be explained in the following with reference to FIGS. 1 to 4. There is shown FIG. 1 in a schematic representation, a plan view of an autostereoscopic display and a viewing space in front of this display, according to some embodiments described in the disclosure;

FIG. 3 in a representation corresponding to FIG. 1, the same display, with here some components of the display having been omitted and only some beam paths being drawn by way of example to explain the proposed control of the display, according to some embodiments described in the disclosure; and FIG. 4 a front view of a part of the pixel matrix, according to some embodiments described in the disclosure.

DETAILED DESCRIPTION

Figure 1:
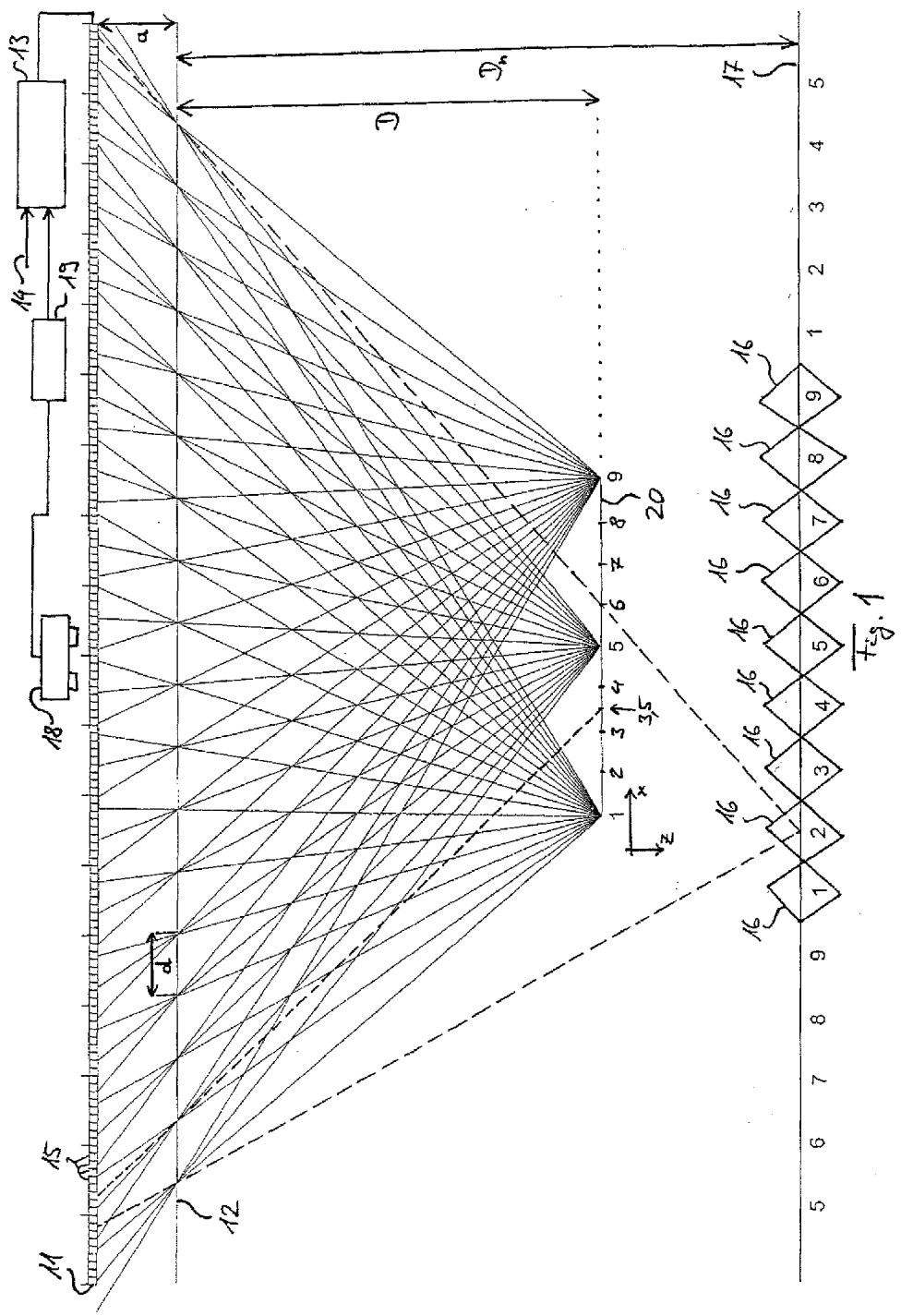

An autostereoscopic display is shown in FIG. 1 which is in particular suitable as a multiview display to display a plurality of different images, nine in the present case, simultaneously. This display has a pixel matrix 11 and an optical element 12 arranged in front of the pixel matrix 11. In addition, the display includes a control unit 13 for controlling the pixel matrix 11 in dependence on image data 14 which define a 3D image. Typically, this 3D image will vary over time so that is more precisely an image sequence. The image data 14 can in this respect be stored e.g. on a data carrier and can be read from there or can be defined by a computer game in dependence on its course.

Figure 2:
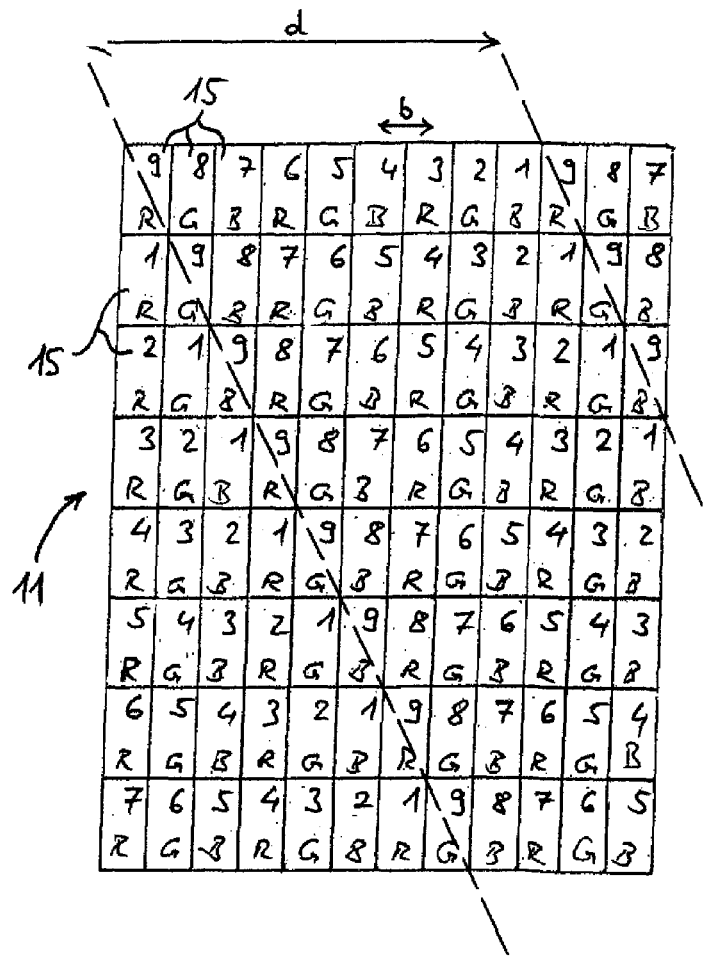
FIG. 2 a detail of a pixel matrix of the display of FIG. 1 in a front view, according to some embodiments described in the disclosure.

The pixel matrix 11 is an LCD or an OLED display having a multitude of pixels 15 which are arranged in different rows. A detail of this pixel matrix 11 is shown in FIG. 2. The individual pixels 15 are each shown by rectangles there. In the present case, the pixels 15 are subpixels of the elementary colors red, green and blue—marked in FIG. 2 by the letters R, G and B respectively.

A plurality of disjoint subsets of pixels 15, nine in the present case—the plurality could naturally also be larger or smaller—are defined on the pixel matrix 11 such that each of these subsets forms a group of parallel strips. The subsets are numbered continuously from 1 to 9 and in FIG. 2 the pixels 15 are each provided with the number of the subset to which the pixel 15 belongs. As can be recognized in FIG. 2, the named strips include a non-zero angle with the rows, with the strips of the different subsets alternating cyclically in the row direction and with each of the strips not containing more than one pixel 15 in each of the rows.

The optical element 12 can e.g. be designed as a slot screen or as a lenticular screen and has a grid-like structure which is oriented parallel to the strips and which is indicated by dashed lines in FIG. 2. In this respect, in the present case, $$d = 9b\, D_n / (D_n + a)$$

applies to a period d of this structure in the lateral direction—corresponding to the row direction—where is a lateral distance from the area centers of adjacent pixels 15, a designates a distance between the pixel matrix 11 and the optical element 12 and $D_n$ stands for a so-called nominal distance. The optical element 12 in each case thereby defines a respective defined propagation direction for light emanating or transmitted from the pixels 15. This is done such that, at the nominal spacing $D_n$ in front of the display, a number, corresponding to the previously named plurality, of nine viewing zones 16 offset laterally relative to one another are defined so that each of the viewing zones 16 is associated with exactly one of the subsets, and such that light emanating or transmitted from each of the subgroups of pixels 15 is directed into the viewing zone 16 associated with this subset. This is illustrated in FIG. 1 by a respective dashed line for two extremely outwardly disposed pixels 15 of the subgroup 2. Modifications in which the optical element 12 is arranged behind the pixel matrix 11 are just as possible. The viewing zones 16 are shown with their diamond-shaped cross-section in FIG. 1 and are numbered continuously from 1 to 9 in accordance with the subgroups. The mutually adjacent viewing zones 16 are each mutually offset laterally by about 65 mm.

On a conventional mode of operation of the display, a respective one of nine stereoscopic half-images is displayed on each of the subgroups of pixels 15 so that one of these stereoscopic half-images is visible from each of the viewing zones 16. The stereoscopic half-images are then selected so that the two stereoscopic half-images visible from directly adjacent viewing zones 16 each combine to form one stereoscopic image corresponding to a view of the 3D image thus displayed. One or more viewers can then each see one of the views of a three-dimensional effect with a depth effect from a viewing plane 17 which is disposed at the nominal distance $D_n$ in front of the display.

Another mode of operation of the display will now be described here in which the pixel matrix 11 is controlled for an autostereoscopic viewing of the 3D image from a viewing distance D differing from the nominal distance $D_n$.

To measure the viewing distance D, the display in the present embodiment has a tracking device which is here given by a stereoscopic camera 18 directed to the viewing space in front of the display and by an evaluation unit 19 for carrying out an image evaluation process. A head position of at least one viewer is detected using this tracking device and the viewing distance D is measured as the distance between an eye pair of this viewer and the display.

The control unit 13 now carries out some of the steps explained in more detail in the following by a corresponding technical program device in dependence on the image data 14 and on the viewing distance D determined by the tracking device for each of the strips of pixels 15 to control the pixel matrix 11 for an autostereoscopic viewing of the 3D image from the viewing distance D in front of the display differing from the nominal distance D.

First, a respective value of a location coordinate x is determined for each of the strips according to a rule which can be described as follows. At a specific height—which can be selected largely as desired—an imaginary line 20 orientated in the row direction—that is horizontally—is defined at a spacing in front of the display which corresponds to the determined viewing distance D. The location coordinate is defined such that it describes a lateral position of locations on the line 20. In the present case, the line 20 is a section of a straight line. It could, however, also extend in a slanted manner or be curved. In this case, let the named distance designate a distance between the display and a defined point, typically a central point disposed in front of the display, on the line 20. The value of the location coordinate is now determined by a simple mathematical operation for each of the strips for the location at which light emanating or transmitted from the pixels of this strip is incident with the propagation direction imposed by the optical element 12 onto the named line 20. This is illustrated by way of example in FIG. 1 for one of the strips by means of a dashed line, and indeed for a strip of pixels 15 which belongs to the subgroup 7 and which is disposed near the left hand margin of the display. The location coordinate x adopts nine discrete possible values for such locations which are disposed exactly in front of the viewing zones 16, seen from the center of the display. The location coordinate x is scaled in the present example such that these are the discrete values 1, 2, 3, 4, 5, 6, 7, 8 and 9. The value of the location coordinate x is in each case determined on a scale which is finely graduated or is even at least quasi without graduations exactly so that it also adopts intermediate values between these discrete values and adopts a number of different values for the different strips which is considerably larger than the previously named plurality of nine. Thus, x=3.5 applies rather precisely e.g. to the strip for which the determination of the value of the location coordinate x is illustrated in FIG. 1. As can also be recognized in FIG. 1, the location coordinate x is defined so that it adopts the discrete values 1, 2, 3, 4, 5, 6, 7, 8 and 9 for the nine directly adjacent strips which extend centrally over the pixel matrix, whereas it also adopts intermediate values disposed therebetween for at least some of the further outwardly disposed strips.

Each value of the location coordinate x therefore stands for a specific position on the line and thus for a specific viewing position with which in turn a specific direction of gaze or perspective on the scene defined by the 3D image can be associated. In a further step, intensity values are now determined for each of the strips and are defined by the image data 14 for an image strip corresponding to this strip of a view of the 3D image which corresponds to a direction of gaze from a position defined by the named value. The respective view is in this respect defined as the two-dimensional view of the 3D image or of the scene displayed by the 3D image which results from this viewing position or from the direction of gaze thereby predefined.

Finally, the pixels 15 of the respective strip is controlled using the thus determined intensity values which in the present case naturally also depend on color information contained in the image data 14 and on the color of the individual pixels 15. In a modification, the pixel matrix 15 could naturally also have multicolor pixels which are then each controlled using correspondingly determined intensity values and color values.

For the discrete values 1, 2, 3, 4, 5, 6, 7, 8 and 9, the named views are defined as the nine stereoscopic half-images which were named above in connection with the conventional mode of operation of the display for a viewing from the nominal distance $D_n$. In the operating mode focused on here, however, most views, of which only individual strips are needed, are defined for intermediate values of the location coordinate x which each correspond to a direction of gaze disposed between the directions of gaze of those nine stereoscopic half-images. To illustrate this, rays are drawn by way of example in FIG. 1 of the x values 1, 5, and 9 which show the points on the pixel matrix 11 from which light must emanate to be incident through the optical element 12 onto the location on the line 20 defined by the respective x value. As can easily be recognized in FIG. 1, these points are, however, only central in one of the pixels 15 from which light actually emanates in exceptional cases. The light emanating from the actually present pixels 15—this always means area centers of the pixels 15—in contrast is incident on the line 20 in most cases onto locations which correspond to intermediate values of the x coordinate. A representation of best possible quality is realized for a viewer positioned at the viewing distance D in front of the display by the control proposed here of these pixels 15 using image information which correspond to correspondingly selected intermediate views.

FIG. 3, in which recurring features are again provided with the same reference numerals, illustrates the relationships again. In a manner of representation otherwise corresponding to FIG. 1, respective light bundles are drawn by way of example here for three different regions of the pixel matrix 11, said pixel bundles emanating there from three to four respective adjacent subpixels 15 and illuminating a region on the line 20 about the location which is defined by the coordinate value x=5. So that a viewer's eye can see a view from this location with as few disturbances as possible, said view corresponding to a direction of gaze from a camera position defined by the value x=5, the pixels 15 of the different subgroups have to be controlled as follows due to the geometrical relationships which are easily recognizable here. At the left hand end of the pixel matrix 11, the pixels 15 of the subgroup 9, and at the right hand end of the pixel matrix 11 the pixels 15 of the subgroup 1 are controlled using the intensity values which belong in the normal case—that is on a viewing from the nominal spacing $D_n$—to the stereoscopic half-image visible in the fifth viewing zone 16. In the region of the pixel matrix identified by the reference numeral 21 in FIG. 3, in contrast, none of the pixels 15 is controlled using intensity values of this view because none of the pixels 15 there is disposed where the corresponding image information would have to be imaged. Instead, the pixels 15 of the subgroup 3 are controlled there using image information of a calculated view which belongs to a value x=4.6, whereas the pixels 15 of the subgroup 4 in the region 21 are controlled using image information of another calculated view which belongs to a value x=5.6. The views are meant by this which would result by taking the displayed scene from camera positions which are disposed at corresponding locations between the camera positions of the fourth and fifth or of the fifth and sixth stereoscopic half-images of the nine stereoscopic half-images named further above.

The line 20 is fixed in such a limited manner in its length or width—that is in the x direction—that the values of the location coordinate x can be clearly determined in the above-described manner. The parameterization of the line 20 by the location coordinate x can naturally also have a different scaling than in the case shown in FIG. 1. It can also be achieved by a stretching of the distances between the positions which correspond here to the discrete x values 1, 2, 3, 4, 5, 6, 7, 8 and 9 with an unchanging association of the views with specific values for x that two views which are visible from two positions on the line 20 remote from one another by an average distance between the eyes of about 65 mm also correspond to two respective perspectives from camera positions correspondingly remote from one another—and not further remote, for instance, with a smaller D. The parallax between two views or more exactly between the views which are approached by the described control and which a viewer can see with his two eyes from the viewing distance D should therefore correspond as exactly as possible to the parallax which results on the viewing of the displayed scene by the average eye distance.

Provision can be made that the value of the location coordinate x is respectively rounded up or down to a next closest intermediate value from a limited number of discrete intermediate values. It would e.g. be possible to determine the location coordinate respectively only up to the first decimal point. Nine respective possible intermediate images are then disposed between the stereoscopic half-images which correspond to the x values 1, 2, 3, 4, 5, 6, 7, 8 and 9. The number of the views needed as a maximum—more precisely the number of which at least individual image strips can be needed—is then reduced to at most 90. The calculation effort can be advantageously restricted by this restriction to a discrete number of views—which is, however, larger than the original number of nine views.

Different processes known per se can be used by a corresponding programming of the control unit 13 to construe the needed views or more precisely the required image strips thereof and to determine the intensity values for the different views.

In particular the following cases are possible:

The image data 14 can e.g. define a depth map and texture values for area segments of a surface reproduced by the depth map. The intensity values can then be determined for the different views in that image information for the required image strip or strips of the respective view are determined from the depth map and from the texture values for the area segments of the surface reproduced by the depth map.

In other cases, the image data define two or more stereoscopic half-images. The intensity values can then be determined for the different views in that disparities between the already defined stereoscopic half-images are determined and image information are determined for the required image strip or strips of the respective view in that this view is defined as an intermediate image between the named stereoscopic half-images in dependence on the disparities and on the respective value of the named location coordinate x by interpolation and/or by transformation—by so-called "morphing". Instead, a depth map can also be calculated from the disparities which result from the already present half-images. Image information for the required image strip or strips of the respective view can then in turn be determined using this depth map.

It must additionally be pointed out that the tracking device is naturally also configured also to determine a lateral location of the at least one eye pair using the head position of the at least one eye pair. The control unit 13 can therefore additionally be configured to control the pixel matrix 11 in dependence on the lateral position determined at least by the tracking device so that a region from which the 3D image is autostereoscopically visible also includes the eye pair or the eye pairs of the tracked viewer or of the tracked viewers. If required, this can be done by a lateral displacement of the line 20 or of the viewing zones 16.

In some embodiments, the viewing distance D is determined by the tracking device and the pixel matrix 11 is controlled in dependence on the viewing distance D thus determined. Instead, the viewing distance D could naturally also be selected by a user—e.g. in dependence on dimensions of a room in which the display is installed—and can be predefined by an input at the control unit 13.

In some embodiments of the display, the optical element 12 can be controllable and form lens elements with refractive properties variable in dependence on a control of the optical element 12. Liquid crystals can be used for realizing such structures known per se. Independently of whether the viewing distance D is fixed arbitrarily by an input or in dependence on output signals of a tracking device, the control unit 13 can be configured in this case to control the optical element 12 in dependence on the viewing distance D so that the refractive properties of the lens elements are adapted to this viewing distance D.

If the pixels 15 of the pixel matrix 11 are controlled as described so far, the 3D image can be seen from a certain region more or less centrally in front of the display, a distance between this region and the display corresponding to the viewing distance D. In FIG. 1, this region can be identified with the part of the line 20 corresponding to x coordinate values of between 1 and 9. However, interference reducing the image quality may occur at the edges of this region. This interference is caused by crosstalk between adjacent strips of pixels in which extracts of images of relatively vastly different perspectives are reproduced. To put this in other words, the problem occurs as, in some cases, an x value close to 9 or 10 will be assigned to one of two adjacent strips of pixels 15 while an x value close to 0 or 1 is assigned to the other of the same two adjacent strips of pixels 15.

The quality loss caused by this phenomenon can be reduced by using averaged intensity values for the respective strips of pixels 15. FIG. 4 illustrates how this is done in a particular embodiment. FIG. 4 shows a part of the pixel matrix 11, this part comprising ten lines and 57 columns of pixels 15. Letters R, G of B on top of the columns indicate whether the pixels 15 of the respective column are red, green or blue, respectively. At least one number is plotted in each of the pixels 15 shown in FIG. 4. These numbers indicate the values of the location coordinate x determined, by the method described above, for the respective pixel 15—or, to be more precise, determined for the strip to which the respective pixel 15 belongs. When determining the values of the location coordinate x, only values between 0 and 10 are admitted. Even within this given location coordinate interval, two different values of the location coordinate x are found for some of the strips of pixels 5. This is due to the fact that the light emanating from the pixels 15 of the respective strip and falling in said region propagates through two adjacent structures of the optical element 11.

The strips of pixels 15 for which two different x values between 0 and 10 are found, i.e. the strips for which the step of determining a value of the location coordinate s results in that two solutions are found, or at least some of them are selected to be the strips of pixels 15 which are controlled using averaged intensity values. The two different x values assigned to these strips—hereafter referred to as $x_1$ and $x_2$—are plotted in the $x_1 \times x_2$ format in FIG. 4. Each of the averaged intensity values I is determined as an average of a first intensity value $f(x_1)$ which is, in the step of determining the intensity values, determined for the respective pixel 15 for a first solution $x_1$ of the two solutions and a second intensity value $f(x_2)$ which is determined for the same pixel for a second solution $x_2$ of the two solutions. Thus, the first intensity value $f(x_1)$ is an intensity value defined by an image point of a view corresponding to a direction of gaze from a position defined by the location coordinate value $x_1$ while the second intensity value $f(x_2)$ is an intensity value defined by an image point of a view corresponding to a direction of gaze from a position defined by the location coordinate value $x_2$. The averaged intensity values I are obtained by adding, for each of the pixels 15 of a particular selected strip, the weighted first intensity value $f(x_1)$ and the weighted second intensity value $f(x_2)$ determined for the respective pixel 15, the first intensity value $f(x_1)$ and the second intensity value $f(x_2)$ being weighted depending on the determined value $x_1$ or $x_2$ of the location coordinate. The weighting factors used for this averaging are defined as being smaller if the determined value is closer to a boundary of the given location coordinate interval from 0 to 10 and larger if the determined value is less close to a boundary of this location coordinate interval. This is illustrated in FIG. 4, for some of the pixels 15 of the selected strips, by the formulae below the visible part of the pixel matrix 11.

In the examples described here, the viewing distance D was smaller than the nominal spacing $D_n$. This is, of course, not necessarily the case. The same steps can be performed analogously in order to adapt the display to be observed with a viewing distance D which is larger than the nominal viewing distance $D_n$.

The invention claimed is:

1. An autostereoscopic display for simultaneously displaying more than two different images, comprising
   a pixel matrix having a multitude of pixels which are arranged in different rows, wherein a plurality of more than two disjoint subsets of pixels are defined on the pixel matrix so that each of the subsets forms a band of parallel strips which include a non-zero angle with the rows, wherein the strips of the different subsets alternate cyclically in the row direction;
   an optical element which is arranged in front of or behind the pixel matrix, which has a grid-like structure orientated parallel to the strips and imposes, for each of the pixels, a defined propagation direction on light emanating or transmitted from the respective pixel such that, at a nominal distance from the display predefined by a geometry of the display, a number, corresponding to the named plurality, of viewing zones, which are laterally offset relative to one another, is defined so that each of the viewing zones is associated with exactly one of the subsets and such that the light emanating or transmitted from each of the subsets of pixels is directed in the viewing zone associated with this subset; and
   a control unit for controlling the pixel matrix in dependence on image data which define a 3D image,
   wherein the control unit is configured to carry out the respective following steps for controlling the pixel matrix for an autostereoscopic viewing of the 3D image from a viewing distance differing from the nominal distance in front of the display for each of the strips of pixels:
      determining a value of a location coordinate, the location coordinate being defined so that it describes a lateral position of locations on a line orientated in the row direction and disposed at a defined height at the viewing distance in front of the display, wherein the value of the location coordinate is determined for the location at which light emanating or transmitted from the pixels of the respective strip is incident on the named line with the propagation direction imposed by the optical element;
      determining intensity values which are defined by the image data for an image strip corresponding to this strip of a view of the 3D image which corresponds to a direction of gaze from a position defined by the named value; and
      controlling the pixels of this strip using the thus determined intensity values.

2. The display of claim 1, wherein the control unit is configured to determine the values of the location coordinate with an accuracy so that the location coordinate adopts, for the different strips, a number of different values which is larger than the named plurality.

3. The display of claim 1, wherein the views for a number, corresponding to the named plurality, of values are a number, corresponding to this plurality, of stereoscopic half-images of which a respective two, which correspond to mutually next closest values of this number of values, combine to form a stereoscopic image, whereas at least one of the views which corresponds to an intermediate value of the location coordinate corresponds to a direction of gaze disposed between the directions of gaze of these stereoscopic half-images.

4. The display of claim 3, wherein the control unit is configured to determine the location coordinate such that it adopts the named number of values for a number, corresponding to the named plurality, of directly adjacent strips which extend centrally over the pixel matrix, whereas it adopts intermediate values for at least some of the further outwardly disposed strips.

5. The display of claim 1, wherein the control unit is configured to determine the intensity values for the different views in that one of:
   image information for the required image strip or strips of the respective view are determined from at least one depth map defined by the named image data and from texture values defined by the image data for surface segments of a surface represented by the depth map; or
   disparities are determined between at least two stereoscopic half-images which are defined by the image data and image data for the required image strip or strips of the respective view are determined in that the view is defined as an intermediate image between the named stereoscopic half-images in dependence on the disparities and on the respective value of the named location coordinate by interpolation and/or by transformation; or
   disparities are determined between at least two stereoscopic half-images which are defined by the image data, a depth map is calculated from the disparities and image information for the required image strip or strips of the respective view is determined using this depth map.

6. The display of claim 1, wherein each of the strips contains at most one pixel from each of the rows of the pixel matrix.

7. The display of claim 1, wherein the display includes a tracking device for determining a distance between an eye pair of at least one viewer and the display, wherein the control unit is configured to control the pixel matrix so that the named viewing distance corresponds to the distance determined by the tracking device.

8. The display of claim 7, wherein the tracking device is configured also to determine a lateral location of the at least one eye pair, wherein the control unit is configured to control the pixel matrix in dependence on the at least one lateral location determined by the tracking device so that the at least one eye pair is located in a region from which the 3D image is autostereoscopically visible.

9. The display of claim 1, wherein the optical element is controllable and forms lens elements having refractive properties variable in dependence on a control of the optical element, wherein the control unit is configured to control the optical element to adapt the refraction properties of the lens elements to this viewing distance.

10. The display of claim 1, wherein the grid-like structure of the optical element is given by periodically arranged strip-shaped structures such as cylindrical lenses or slots, a lateral offset of adjacent strip-shaped structures being greater by a factor $n \times D_n/(D_n+a)$ than a lateral offset of the directly adjacent strips of pixels, wherein a denotes an effective distance between the pixel matrix and the optical element, $D_n$ denotes the nominal distance of the autostereoscopic screen, and n denotes an integer greater than two corresponding to said plurality.

11. The display of claim 1, wherein the control unit is configured to control the pixels of selected strips of the strips of pixels using averaged intensity values, the selected strips being determined as the strips or some of the strips for which the step of determining a value of the location coordinate has, within a given location coordinate interval, two solutions due to the fact that the light emanating from the pixels of the respective strip propagates through two adjacent structures of the optical element, wherein each of the averaged intensity values is determined as an average of a first intensity value which is determined for the respective pixel for a first solution of the two solutions and a second intensity value which is determined for the same pixel for a second solution of the two solutions.

12. A method for displaying a 3D image on an autostereoscopic display having a pixel matrix and an optical element arranged in front of or behind the pixel matrix,
wherein the pixel matrix has a multitude of pixels which are arranged in different rows, wherein a plurality of more than two disjoint subsets of pixels are defined on the pixel matrix so that each of the subsets forms a band of parallel strips which include a non-zero angle with the rows, wherein the strips of the different subsets alternate cyclically in the row direction,
wherein the optical element has a grid-like structure orientated parallel to the strips and imposes, for each of the pixels, a defined propagation direction on light emanating or transmitted from the respective pixel such that, at a nominal distance in front of the display predefined by a geometry of the display, a number, corresponding to the named plurality, of viewing zones, which are laterally offset relative to one another, is defined so that each of the viewing zones is associated with exactly one of the subsets and such that the light emanating or transmitted from each of the subsets of pixels is directed in the viewing zone associated with this subset,
wherein the pixel matrix is controlled, in dependence on image data which define a 3D image,
for an autostereoscopic viewing of the 3D image from a viewing distance in front of the display differing from the nominal distance, wherein the method includes the following steps for each of the strips of pixels:
determining a value of a location coordinate, the location coordinate being defined so that it describes a lateral position of locations on a line orientated in the row direction and disposed at a defined height at the viewing distance in front of the display, wherein the value of the location coordinate is determined for the location at which light emanating or transmitted from the pixels of the respective strip is incident on the named line with the propagation direction imposed by the optical element;
determining intensity values which are defined by the image data for an image strip corresponding to this strip of a view of the 3D image which corresponds to a direction of gaze from a position defined by the named value; and
controlling the pixels of this strip using the thus determined intensity values.

13. The method of claim 12, wherein the values of the location coordinate are determined with an accuracy so that the location coordinate adopts, for the different strips, a number of different values which is larger than the named plurality.

14. The method of claim 12, wherein the views for a number, corresponding to the named plurality, of values are a number, corresponding to this plurality, of stereoscopic half-images of which a respective two, which correspond to mutually next closest values of this number of values, combine to form a stereoscopic image, whereas at least one of the views which corresponds to an intermediate value of the location coordinate corresponds to a direction of gaze disposed between the directions of gaze of these stereoscopic half-images.

15. The method of claim 14, wherein the location coordinate is determined such that it adopts the named number of values for a number, corresponding to the named plurality, of directly adjacent strips which extend centrally over the pixel matrix, whereas it adopts intermediate values for at least some of the further outwardly disposed strips.

16. The method of claim 12, wherein the intensity values for the different views are determined in that one of:
the intensity values for the required image strip or strips of the respective view are determined from at least one depth map defined by the named image data and from texture values defined by the image data for area segments of a surface represented by the depth map; or
disparities are determined between at least two stereoscopic half-images which are defined by the image data and intensity values for the required image strip or strips of the respective view are determined in that the view is defined as an intermediate image between the named stereoscopic half-images in dependence on the disparities and on the respective value of the named location coordinate by interpolation and/or by transformation; or
disparities are determined between at least two stereoscopic half-images which are defined by the image data, a depth map is calculated from the disparities and the intensity values for the required image strip or strips of the respective view are determined using this depth map.

17. The method of claim 12, wherein a distance between an eye pair of at least one viewer and the display is detected, wherein the viewing distance is correspondingly selected as the thus detected distance for determining the values of the location coordinate for the different strips.

18. The method of claim 12, wherein the step of controlling the pixels of the respective strip using the determined intensity values is done by controlling the pixels such that the image strip which corresponds to this strip of the view of the 3D image corresponding to the direction of gaze from the position defined by the named value of the location coordinate is reproduced by the pixels of this strip of pixels, wherein the image strip corresponding to this strip is a strip-shaped extract of said view having, in the complete view, an orientation and position corresponding to the orientation and position of the strip of pixels in the pixel matrix.

19. The method of claim 12, wherein the pixels of selected strips of the strips of pixels are controlled using averaged intensity values, the selected strips being determined as the strips or some of the strips for which the step of determining a value of the location coordinate has, within a given location coordinate interval, two solutions due to the fact that the light emanating from the pixels of the respective strip propagates through two adjacent structures of the optical element, wherein each of the averaged intensity values is determined as an average of a first intensity value which is determined for the respective pixel for a first solution of the two solutions and a second intensity value which is determined for the same pixel for a second solution of the two solutions.

20. The method of claim 19, wherein the averaged intensity values are obtained by adding, for each of the pixels of a particular selected strip, the weighted first intensity value and the weighted second intensity value determined for the respective pixel, the first and the second intensity values being weighted depending on the determined value of the location coordinate, a weighting factor used for weighting the first and the second intensity values being smaller if the determined value of the location coordinate is closer to a boundary of the given location coordinate interval and larger if the determined value of the location coordinate is less close to a boundary of the given location coordinate interval.

* * * * *